1

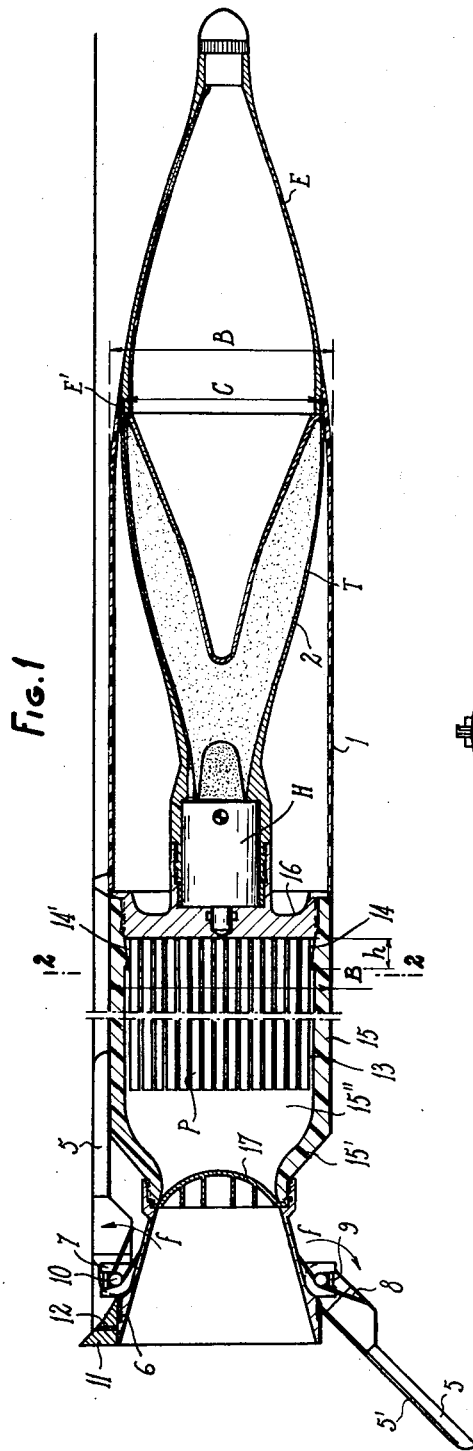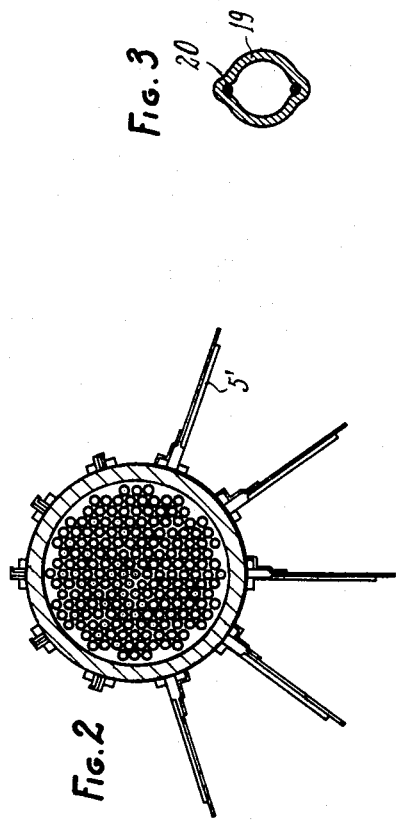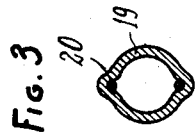

3,234,878
POWDER-FUELLED ROCKET
Michel Precoul, Paris, France, assignor to Societe Technique de Recherches Industrielles et Mecaniques, Paris, France
Filed Sept. 27, 1963, Ser. No. 312,090
Claims priority, application France, Oct. 5, 1962, 911,442
2 Claims. (Cl. 102—98)

This invention relates to powder-propelled rockets more especially war rockets, and is particularly concerned with the construction of the propellant powder charge therein.

Objects of the invention include the provision of an improved type of powder charge for a powder-propelled rocket having part or all of the following advantageous features:

Reduced sensitivity to shock and vibrations during storage and handling with a corresponding increase in safety;

Extremely high combustion rate of the charge resulting in correspondingly high acceleration and initial velocity making possible a substantial reduction in the length of the firing tubes used in firing the rockets;

High packing coefficient;

Simplified manufacture.

Further objects will appear as the disclosure proceeds.

In accordance with a basic teaching of the invention a rocket fuel charge comprises a multiplicity of elongated fuel elements of small width/length ratio extending parallel to the dimension of the rocket, said elements being spaced from one another on a plane transverse to the rocket, and means fixedly securing forward end portions of all said elements in rigid relation to the rocket while retaining said elements substantially free over the major portions of their length rearward from said secured end portions thereof.

Preferably all the fuel elements have their forward ends embedded in a solid mass of molded material. The resulting configuration of the rocket fuel charge is closely comparable with that of a brush, having its "bristles," i.e. the individual elongated fuel elements, extending in a rearward direction parallel to the axis of the rocket.

An exemplary embodiment of the invention will be described for purposes of illustration but not of limitation with reference to the accompanying drawings wherein:

FIG. 1 is a longitudinal sectional view of an improved rocket projectile constructed according to the invention, with certain parts irrelevant to the invention omitted for clarity;

FIG. 2 is a cross section on line 2—2, FIG. 1; and

FIG. 3 is a cross sectional view of one form of fuel element on an enlarged scale.

The rocket here shown and described by way of example is a war rocket more especially suitable for antitank use. The general construction of the rocket may be more or less conventional, and in this example comprises a payload section generally designated T including a warhead E of the hollow-charge type, and a rear propulsion section generally designated P followed by a tail section. The outer diameter C of the forward section T is slightly less than the diameter B of the rear propulsion section P. The two sections are externally interconnected by a generally cylindrical outer body or fairing 1, made e.g. from reinforced phenoplast or polyester sheet, merging gradually at its forward end with the tapered warhead E as shown at E'. The tail or empennage structure of the rocket is of the expanding type, comprising a number of tail fins 5 one of which is shown in rearwardly expanded position in the lower part of FIG. 1, and in its forwardly retracted position overlying the rear part of section P at the top of the figure. The fins 5 are pivoted for rotation between these positions by means of transverse pivot pins 10 carried by members 7 projecting outwardly from the wall of nozzle 6. This nozzle 6 may be made from asbestos-reinforced plastic material. The pivots 10 are retained with pins 9 and carry hairpin-type wire springs 8 having oppositely projecting legs respectively engaging the surface of nozzle 6 and the surface of the related fins 5 so as to tend to rotate the fins to their retracted position as shown by arrows f. In the idle or storage position the fins 5 are held in their retracted positions by a retainer ring 11 fitted over the rear end of the nozzle and retained in position thereon with shearble pins 12. As the rocket is fired, the inertia of ring 11 cause the pins 12 to be sheared. However the fins 5 remain in their retracted positions during travel of the rocket through the launching tube owing to the confining action of the surrounding tube surface. The outer edges 5' of the retracted fins at this time engage the tube surface and serve to guide the rocket therein. As the rocket issues out of the tube the fins 5 are rotated to their expanded positions by the combined forces of the spings 8 and air drag acting on the trailing edges 5'.

The propulsion unit P comprises a tubular casing or body 15 of suitable plastic material having a cylindrical main portion followed rearwardly by a converging portion 15' merging with nozzle member 6, and separated therefrom in the idle condition by a removable sealing diaphragm 17. The inner surface of tubular casing 15 is formed in a region spaced somewhat from its front end with a rearwardly tapered seating section 14', into which fits a complementarily tapered generally circular block 14 which forms the base of the powder charge assembly according to the invention, presently described. For retaining the powder charge assembly in position after insertion of its base block 14 into the conical seating surface 14' from the open forward end of tubular casing 15, a generally circular plugging member 16 is engaged into the open front end of casing 15, which may if desired be screw threaded for this purpose. The plugging member 16 has an outwardly projecting peripheral flange at its front end which tightly engages the front end surface of casing 15 to improve the gas-tight seal. Plug member 16 further includes a central boss or hub projecting forwardly from it and connecting with the section T, and containing an igniter cap H for the hollow-charge of the warhead. The warhead section T itself does not require description since it forms no part of the present invention.

Returning now to the propulsive charge unit of the invention, this as already indicated comprises the generally circular baseblock 14 which is peripherally tapered in an axial direction for insertion into the correspondingly tapered seating section 14' of casing 15. This base block 14 comprises a suitable molded plastic composition such for instance as polyester resin reinforced with silica filler or the like. Imbedded in closely spaced relation in the mass of the base block 14 are end portions of a multiplicity of individual fuel elements 13, of elongated form, preferably of uniform cross section throughout their length, i.e. cylindrical or prismatic. Each fuel element 13 may comprise a tubular strip of sheet material constituting an elementary charge of powder fuel. Any of the various powder compositions used as propulsive fuel in rockets may be used according to the invention, e.g. so-called double-base powder, "Ballistite," or the like. The dimensions of the fuel elements 13 according to the invention may vary widely, but it is preferred that the width/length ratio therein is preferably not substantially greater than 1/25, and preferably 1/10 or less. The diameter or width dimension of each fuel element 13 is usually less than 10 mm., and preferably about 5 mm., or somewhat less. Their thickness is preferably from 0.5 to 0.8 mm. The ratio of the width or diameter of the individual fuel elements to the total inner diameter of the casing 15 in which they are housed, and hence also the total number of fuel elements provided, will vary with the size and other characteristics of the rocket and the acceleration to be imparted to it. Generally, the said ratio is less than 1/10 and preferably less than 1/20, and the total number of elements is generally at least several tens of units and preferably one or more hundreds.

With the fuel charge thus described inserted in position in the casing 15, the fuel elements 13 project rearwardly from block 14 a distance such as to leave in the rear portion of casing 15 a free space 15″ constituting a combustion chamber.

It will be appreciated that the novel rocket propellant charge unit of the invention described above when considered separately, e.g. prior to bodily insertion thereof into the casing 15, resembles a brush with long projecting bristles, the individual fuel elements 13. These fuel elements are all embedded at their forward ends in the common molded mass of the baseblock 14, and the length of the embedded end portions, indicated as h in FIG. 1, is predetermined to afford the requisite stability. The material of which the baseblock is formed, can easily be selected to present heat expansion factors closely approaching that of the powder charge, thereby ensuring a firm bond in the charge assembly at all temperatures. The charge unit is easily mounted in the body of the rocket by simply sliding the tapered baseblock 14 axially into the corresponding tapered seating section 14′ of casing 15, through the open front end of the latter, and then inserting the plugging member 16. In this condition the baseblock 14 in addition to its retaining action for the fuel elements 13, serves as a strong and stable base capable of taking up effectively the inertia forces arising at firing, as well as providing a tight seal which, together with plug 16, prevents leakage of combustion gases forwardly through the rocket. During storage and handling of the rocket, the base 14 constitutes in effect a shock mount for the fuel elements, so that the sensitivity of the charge to shock and vibrations is greatly reduced with a corresponding increase in safety during manipulations.

In another connection, a highly important advantage of the charge unit of the invention is that the subdivision of the total fuel charge into a multiplicity of separate but closely-spaced fuel elements of the form described is found greatly to improve the conditions of combustion. The combustion rate is substantially increased (combustion time reduced) over that of a conventional fuel charge of similar weight and size, thus increasing the accelerations and velocities achievable, or/and making possible a substantial reduction in the length of the firing tubes from which the improved rockets are discharged. Thus, rockets projectiles embodying the improved propulsive charges of the invention, when fired from individual weapons having firing tubes less than 1.50 meters long can attain velocities of about 300 to 350 m./sec., and when fired from collective or multiple weapons having tubes 2 m. long or more, the velocities reached can exceed 400 m./sec. Such characteristics are especially advantageous in connection with anti-tank combat.

Returning to the construction of the individual fuel elements 13, as earlier indicated each element is preferably a tubular element of cylindrical or prismatic shape. Such elements can easily be produced in quantity by extrusion or by winding a strip into a tube. In some cases combustion and gas outflow in operation may be improved if the tubes are slotted along a generatrix, and this can very simply be accomplished in such a winding operation.

Mechanical strength of the individual fuel elements is a highly important consideration in the charge assembly of the invention, and some difficulties may be encountered in this respect since most powder compositions are fragile at low temperatures and tend to flow at high temperatures. Accordingly, according to a feature of the invention longitudinal reinforcing means are advantageously provided in each of the fuel elements. Thus as shown in FIG. 3, a tubular fuel element here designated 19 has a pair of reinforcing wires or fibres 20 associated therewith along diametrically opposite generatrices for taking up axial tensile stresses. The fibres 20 may be made from nylon or other high-tensile fibre material and may be bonded to the tubular element in any suitable way, as by pressing at ordinary or elevated temperature or with adhesive. The reinforcement may be provided internally of the tubular element (as shown) or externally thereof.

It will be apparent that various departures may be made from the specific embodiment illustrated and described without departing from the scope of the invention. Such modifications may involve the construction of the individual fuel elements of the invention, the mounting of the charge unit as a whole within the rocket, as well as the construction of the rocket in which the novel propulsive unit is incorporated.

I claim:

1. A rocket comprising an elongated tubular body having front and rear ends and a fuel charge located in said body, an annular truncated support surface within the front end of said body with a conicity directed towards the rear end, said charge comprising a plurality of elongated fuel elements having a slight width with relation to their length extending parallel to the longitudinal axis of said body, each element being substantially self-supporting and being spaced transversely from a neighboring element, a base block formed by a molded mass of plastic in which are embedded by molding the forward portions of all said elements, said elements being all of the same length and extending freely from said block towards the rear end, said block having an exterior conical surface with the conicity directed towards the rear, said conical surface of said block being in contact with and supported by the support surface located in said body.

2. A rocket comprising an elongated tubular body having front and rear ends and a fuel charge located in said body, an annular truncated support surface within the front end of said body with a conicity directed towards the rear end, said charge comprising a plurality of elongated fuel elements having a slight width with relation to their length extending parallel to the longitudinal axis of said body, each element being substantially self-supporting and being spaced transversely from a neighboring element, a base block formed by a molded mass of plastic in which are embedded by molding the forward portions of all said elements, said elements being all of the same length and extending freely from said block towards the rear end, said block having an exterior conical surface with the conicity directed towards the rear, said conical surface of said block being in contact with and supported by the support surface located in said body and a plugging member applied upon said base block and upon the support surface in the body of said rocket.

References Cited by the Examiner
UNITED STATES PATENTS

| | | | |
|---|---|---|---|
| 952,538 | 3/1910 | Luciani | 102—98 |
| 2,487,053 | 11/1949 | Hickman | 60—35.6 |
| 2,488,154 | 11/1949 | Africano | 60—35.6 |
| 2,502,458 | 4/1950 | Hickman | 60—35.6 |
| 2,503,269 | 4/1950 | Hickman | 102—49 |
| 2,522,514 | 9/1950 | Hickman | 102—76 |
| 2,545,204 | 3/1951 | Hickman | 102—49 |
| 2,549,811 | 4/1951 | Hickman | 60—35.6 |
| 2,613,605 | 10/1952 | Brandt | 102—50 |
| 3,022,735 | 2/1962 | Eberle | 102—98 |
| 3,053,184 | 9/1962 | Francois | 102—49 |
| 3,140,663 | 7/1964 | Rumbel et al. | 102—98 |

BENJAMIN A. BORCHELT, *Primary Examiner.*

SAMUEL FEINBERG, *Examiner.*

R. F. STAHL, *Assistant Examiner.*